(No Model.)
M. D. NEVILLE.
DEVICE FOR COOKING AND TURNING OMELETS.
No. 386,599. Patented July 24, 1888.
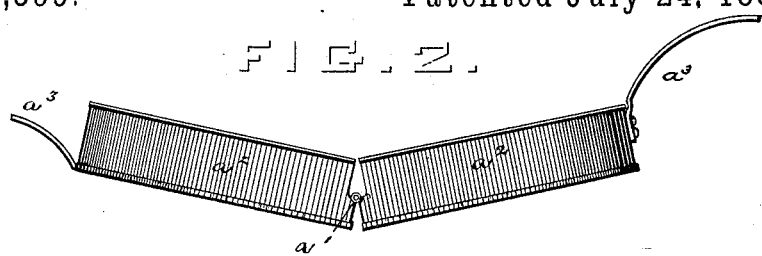
FIG. 2.
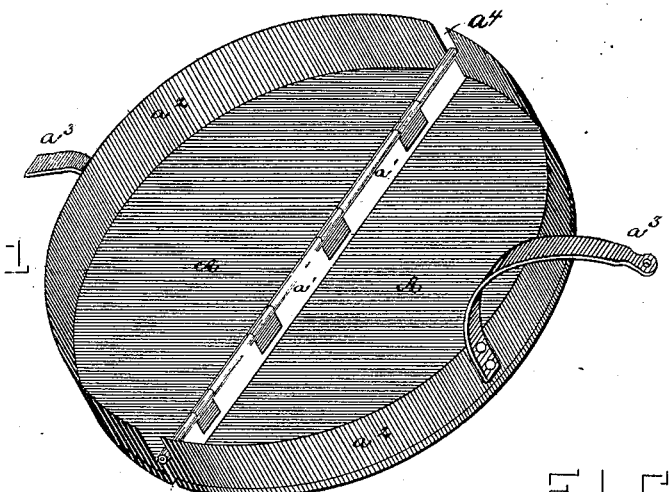
FIG. 1.
FIG. 3.
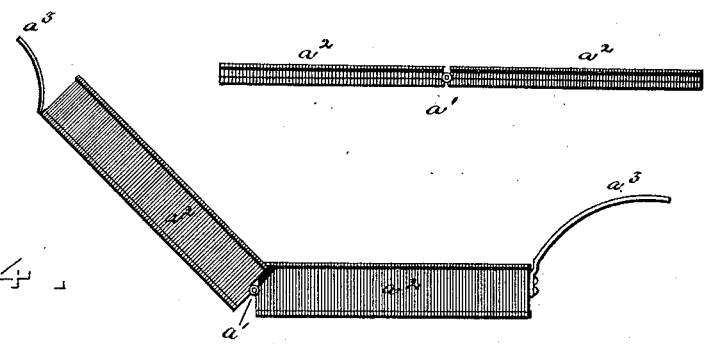
FIG. 4.
WITNESSES:
C. Raymond Weaver
Robt. Lee Clark
INVENTOR,
Mary D. Neville.
BY
Price & Stewart
ATTORNEYS.

UNITED STATES PATENT OFFICE.

MARY D. NEVILLE, OF WELBOURNE, VIRGINIA.

DEVICE FOR COOKING AND TURNING OMELETS.

SPECIFICATION forming part of Letters Patent No. 386,599, dated July 24, 1888.

Application filed June 15, 1887. Serial No. 241,346. (No model.)

*To all whom it may concern:*

Be it known that I, MARY D. NEVILLE, of Welbourne, Loudoun county, in the State of Virginia, have invented a new and Improved Device for Cooking and Turning Omelets, of which the following is a specification.

It is well known that at present omelets are first cooked by breaking the eggs upon an ordinary pan, and then with a knife or turner specially adapted for the purpose the omelet is doubled or one half turned over the other by slipping the instrument under one side and lifting it until it falls upon the other, thereby presenting for the table an outside browned, while the inside is closed up. My present plan of cooking the omelet leaves it in the same condition, dispensing with the annoyance of an independent device or instrument for doubling the omelet and provides a means for accomplishing this purpose by the pan itself within which it is cooked.

The accompanying drawings illustrate my invention, of which—

Figure 1 is a perspective view of the omelet-pan with the proportions of the hinge in the middle and the depth of the pan enlarged; Fig. 2, a side elevation of same, showing a round pan, as in Fig. 1; Fig. 3, a side view of pan opened and having its proportions about as practically used; Fig. 4, a side view of pan made square.

A A represent the base of a pan in two parts joined together, as shown, by the hinge $a'$. The base of the pan is surrounded by the rim $a^2$. The hinge is constructed sufficiently low to allow an egg when broken to lie over the hinge and occupy a part of the pan on either side of it, and the rim $a^2$ is cut out or notched on one or both parts of the pan above the hinge, so as to permit one part to be turned over and to enter within the other sufficiently to double the omelet.

$a^3$ are handles for convenience in handling and turning one side of the pan over the other.

The operation is as follows: When the pan is ready, it is placed over the fire open, as shown in Fig. 1. The eggs are broken and allowed to flow over the hinge and occupy a part of both sides of the pan, which is allowed to remain in this position until the eggs are cooked. One side of the pan is then turned over the other, so that it enters within it sufficiently to double the omelet. This operation doubles the omelet. The pan is again opened and the omelet dropped out, presenting it with both sides properly browned and ready for the table.

What I claim is—

An omelet-pan made in two parts and constructed with a rim, $a^2$, said rim cut out or notched, as shown at $a^4$, to allow one side of the rim of the pan to enter within the other, the parts joined together by a hinge constructed approximately midway between the bottom of the pan and the top of the rim, in combination with the handles $a^3$, for turning one side of the pan over the other and for handling the pan, substantially as described.

MARY D. NEVILLE.

Witnesses:
C. E. WIEDMAYER,
V. E. LAKE.